(12) United States Patent
Cranford, Jr.

(10) Patent No.: US 6,999,540 B2
(45) Date of Patent: Feb. 14, 2006

(54) PROGRAMMABLE DRIVER/EQUALIZER WITH ALTERABLE ANALOG FINITE IMPULSE RESPONSE (FIR) FILTER HAVING LOW INTERSYMBOL INTERFERENCE AND CONSTANT PEAK AMPLITUDE INDEPENDENT OF COEFFICIENT SETTINGS

(75) Inventor: Hayden C. Cranford, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 09/749,908

(22) Filed: Dec. 29, 2000

(65) Prior Publication Data

US 2002/0084870 A1 Jul. 4, 2002

(51) Int. Cl.
*H04B 1/10* (2006.01)

(52) U.S. Cl. .................. 375/350; 375/229; 375/222; 710/69; 709/250; 708/323; 708/319; 333/166; 327/112

(58) Field of Classification Search .............. 375/350, 375/222, 229; 708/323, 319; 710/69; 709/250; 333/166; 327/112

See application file for complete search history.

(56) References Cited

U.S. PATENT DOCUMENTS

| | | | | | |
|---|---|---|---|---|---|
| 4,374,426 A | * | 2/1983 | Burlage et al. | ............ | 708/323 |
| 4,607,241 A | * | 8/1986 | Horowitz et al. | ........... | 333/166 |
| 5,739,707 A | * | 4/1998 | Barraclough | ................ | 327/112 |
| 6,125,415 A | * | 9/2000 | Liu | .............. | 710/69 |
| 6,332,166 B1 | * | 12/2001 | Cranford et al. | ............ | 709/250 |
| 6,553,398 B1 | * | 4/2003 | Capofreddi | ................ | 708/319 |
| 2001/0043649 A1 | * | 11/2001 | Farjad-Rad | ................ | 375/229 |
| 2001/0048716 A1 | * | 12/2001 | Gough et al. | ............... | 375/222 |

OTHER PUBLICATIONS

JoAnne Woodcock; Computer Dictionary; $2^{nd}$ Edition; Microsoft Press; Copyright 1994.*

* cited by examiner

*Primary Examiner*—Stephen Chin
*Assistant Examiner*—Sudhanshu C. Pathak
(74) *Attorney, Agent, or Firm*—Morgan & Finnegan L.L.P.

(57) ABSTRACT

A programmable driver/equalizer with an alterable FIR enables the equalization of serial links or other transmission systems to adapt to a variety of transmission media, specifically, intersymbol interference (ISI). Current mode differential drive circuits are coupled to a transmission media via a Finite Impulse Response (FIR) filter operating in the Z transform mode. The FIR filter includes A and B coefficient setting circuit, and is coupled to the drivers. The driver circuit also includes A coefficient level driver compensation and B coefficient level driver compensation to reduce self-induced ISI from the driver while the filter coefficients are activated. The coefficient setting circuit receive a combination of control bits to select the appropriate response for the driver to the various transmission media parameters. Adjustments to the driver output current are made at data run lengths exceeding certain values and subsequent adjustments are made for data run lengths exceeding larger values.

33 Claims, 15 Drawing Sheets

PROGRAMMABLE DRIVER/EQUALIZER WITH ALTERABLE ANALOG FINITE IMPULSE RESPONSE (FIR) FILTER HAVING LOW INTERSYMBOL INTERFERENCE AND CONSTANT PEAK AMPLITUDE INDEPENDENT OF COEFFICIENT SETTINGS

BACKGROUND OF INVENTION

1. Field of Invention

This invention relates to transversal filter equalizer methods, systems and program products. More particularly, the invention relates to methods, systems and program products for a programmable driver/equalizer with alterable analog Finite Impulse Response (FIR) filter having low intersymbol interference and constant peak amplitude independent of coefficient settings.

2. Description of Prior Art

In transmission systems, particularly those for serial links in backplanes, there exists a need to equalize the link from the perspective of reducing the differences between long run lengths of data and short run lengths of data. The frequency content of the data will vary with the data itself. As a result, InterSymbol Interference (ISI) results which manifests itself in the distortion of the data signal and interference of one bit with one or more subsequent bits. Equalization when performed at the transmit end is normally specific to a given transmit medium, and the inherent parameters associations with the transmit media. The problem can be mitigated by properly filtering the pulses prior to transmission to compensate for the impairment in the transmission system. The pre-filtering has the effect in systems for serial links of equalizing the link from the perspective of reducing the differences between long run lengths of data and short run lengths of data. What is needed in the art is a driver with an alterable analog Finite Impulse Response (FIR) filter for serial links to enable the equalization in the system to adapt to a variety of transmission media and impairment. A constant peak amplitude is desirable in serial links so that a given link type may be equalized for a variety of attenuation amounts while preserving freedom to set different equalizations.

Prior art related to transversal filter equalizers includes the following:

U.S. Pat. No. 4,607,241 issued Aug. 19, 1986, discloses a transversal filter equalizer using a tapped delay line in which symmetrically located pairs of tap signals are combined by means of adders and subtracters, to provide partial output signals which are separately controlled in amplitude and phase. The partial output signals, which have no D.C. component, are then summed with a partial signal derived from a center tap reference signal to reinsert the D.C. component and to provide the equalized output signal.

U.S. Pat. No. 5,479,363 issued Dec. 26, 1995, discloses a programmable digital finite impulse response filter and correlator which includes a p-tap consisting of a switchable unit-delay and a two-non-zero-digital partial product generator and adder. The combination of several p-taps, made possible by the switchable delay, allows for the efficient implementation of coefficients with more than two non-zero digits. The switchable unit-delay not only allows the programming of the number of taps and the specific tap coefficient values, it provides a capability for programming the optimal allocation of hardware resources to each filter tap.

A publication entitled "A High Speed Programmable Digital FIR Filter " by J. B. Evans et al., 1990 International Conference on Acoustics, Speech and Signal Processing, Albuquerque, N.Mex., Apr. 3–6, 1990, discloses the use of powers-of-two quantized coefficients which allows the simplification of circuitry required for the implementation of FIR filters by replacing multiplication with a limited number of shift-and-add operations with the corresponding increase in speed and area efficiency.

A publication entitled "A 100 MHz 40-Tap Programmable FIR Filter Chip" by M. Halamian et al., IEEE International Symposium on Circuits & Systems ($23^{rd}$ 1990: New Orleans, La., May 1–3, 1990) discloses a 40-tap filter in which each tap consists of a 12×10 bit multiplier, a 26-bit adder and a 10-bit adder along with 5 registers. Registers R1 and R2 represent the pipeline registers inserted in a computation path to achieve a desired throughput. Registers 3 and 4 are placed in a return path for the purpose of handling the symmetric filtering mode. Register 5 is used to hold the partial sums needed for the FIR filtering operation. The input signal is broadcast to all 40-taps in parallel. The $40^{th}$ stage is fed back through control logic to the input of the next stage. The return path in the cascaded structure forms a chain of registers that feeds the delayed version of the input signal to the input adder of each module of each tap for the purposes of implementing a symmetric/anti-symmetric filter.

None of the prior art discloses a driver equalizer in which coefficients of the equalizer filter are alterable in arbitrarily small increments (analog), matched to each other, and a constant peak amplitude, independent of coefficient selection enabling power settings to be used for all possible coefficient possibilities whereby the output of the driver is matched to the inverse of transmission line frequency response regardless of transmission media type.

SUMMARY OF THE INVENTION

An object of the invention is a transversal filter equalizer method, system and program product for low intersymbol interference.

Another object is a programmable transversal filter equalizer method, system and program product for low intersymbol interference and constant peak amplitude independent of coefficient setting.

Another object is a programmable transversal filter equalizer, method, system, and program product, for altering the frequency response of a controllable driver set to match the inverse of the frequency response of a transmission medium.

Another object is a programmable transversal filter equalizer for switching driver circuits off high capacitance node when adjustable filter coefficients are inactive.

Another object is a programmable transversal filter equalizer including shift register elements for time delay in processing digital input signals.

Another object is a programmable transversal filter equalizer having programmable coefficients which are set based on the characteristics of a transmission media, transmission speed, and characteristics of receiving.

These and other objects, features, and advantages are achieved in a programmable driver/equalizer with an alterable FIR circuit for equalizing serial links or other transmission systems to adapt to a variety of transmission media and impairments, specifically, InterSymbol Interference (ISI). Current mode differential drive circuits are coupled to a transmission media via a Finite Impulse Response (FIR) filter operating in a Z transform mode. The filter transfer function is of the general form of H $(Z)=Ab_0+Ab_1Z^{-1}+AB_2Z^{-2}+\ldots AB_nZ^{-n}$ where the values of the coefficients $B_{-n}$ are negative. The numerical value of the coefficients are set by register values in A and B coefficient setting circuits connected to the transmission line at the output of the drivers. The driver circuits include A coefficient level compensation and B coefficient level compensations for self-induced ISI from the driver while the filter coefficients are activated. The driver includes logic to reduce ISI by switching "off" high capacitance nodes when the filter coefficients are inactive. A bias circuit for thedriver is coupled to a current mirror, which feeds a reference current from the bias circuit to the filter and logic circuit. The alterable filter circuit comprises A and B delay circuits for each coefficient being additively connected together between the input and the output of the past inputs and outputs while providing an output signal which is inverse of the transmission system. Each delay in the filter is realized by a shift register which stores the current outgoing data bit and a history of three previous bits. The output equals a preceding input as represented by the stored bits in the shift register. By setting the coefficients of the filter independently over a range which is controlled by a series of matched current sources; good tracking of the coefficients of the FIR is achieved, which enables the driver to adapt to a variety of transmission media and impairments.

BRIEF DESCRIPTION OF THE DRAWINGS

The invention will be further understood from the following detailed description of a preferred embodiment taken in conjunction with an appended drawing, in which.

DESCRIPTION OF PREFERRED EMBODIMENT

Figure 1:
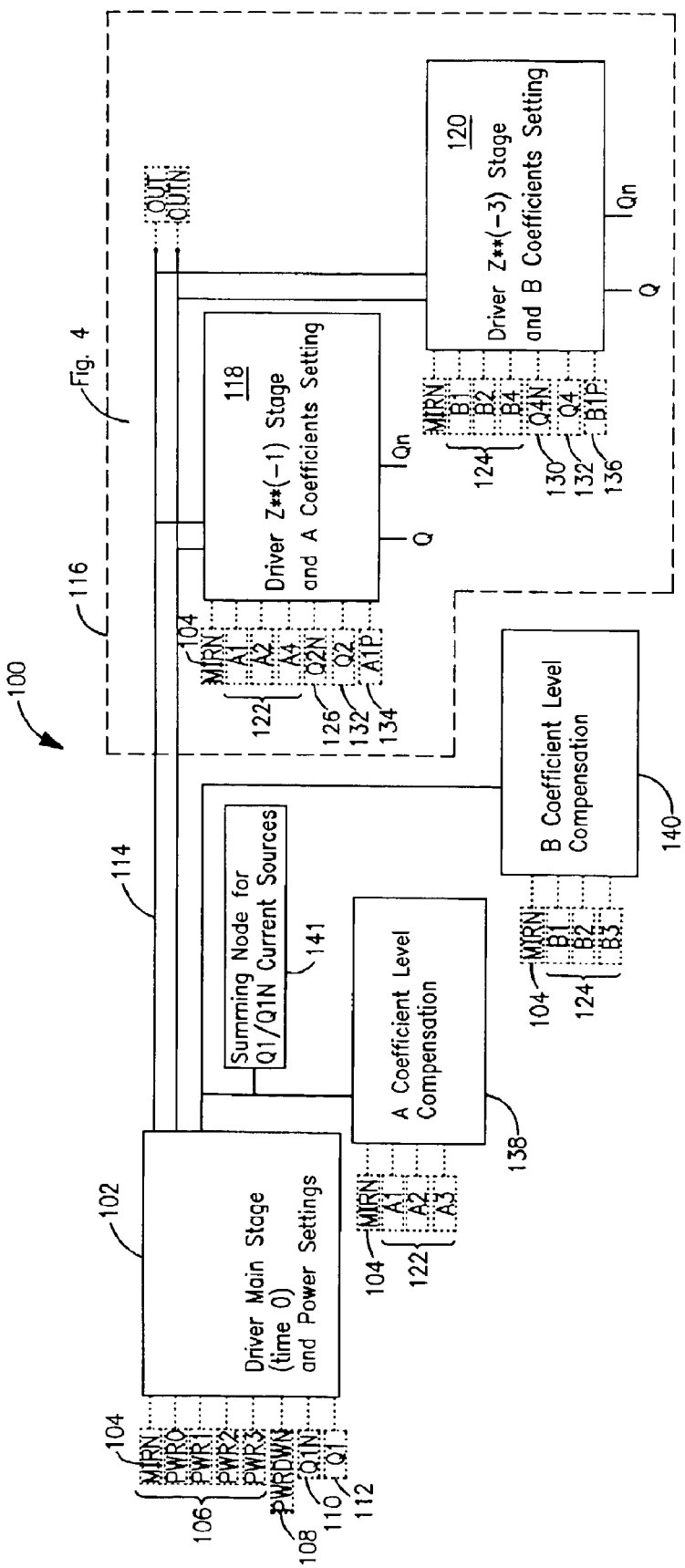
FIG. 1 is a block diagram of a programmable driver with a transversal filter equalizer coupled to a transmission media incorporating the principles of the present invention and including a driver and power setting stage; a driver A coefficient level compensation stage; a driver B coefficient level compensation stage; an A coefficient filter setting stage; and a B coefficient filter setting stage.

In FIG. 1, a programmable driver equalizer 100 includes a driver main stage and power setting circuit 102 responsive to a current mirroring supply 104 for establishing the biasing level of all of the equalizer components. The driver 102 is also responsive to power signals PWR0 . . . 3 106 for a plurality of differential current amplifiers coupled to a transmission media 114. A power down signal 108 is provided which switches the equalizer components off high capacitance node when filter coefficients are inactive, as will be described hereinafter. Q1 and Q1N control signals are generated by a Ffir Filter 116 as will be described in conjunction with FIG. 7 and provided as true and complement signals 110 and 112, for the differential current amplifiers in the power setting circuit as will be described hereinafter.

The driver 100 provides OUT and OUTN (true and complement) to the transmission line 114. The Finite Impulse Response filter 116, to be described in FIG. 4, includes an A coefficient driver setting circuit 118 and a B coefficient driver setting circuit 120. Each coefficient setting circuit is biased by the mirror end supply 104. Programmable A1, A2, and A4 input control signals 122 are provided to the A coefficient circuit 118 and programmable B1, B2, and B4 input control signals 124 are provided to the B coefficient setting circuit 126. The A coefficient driver setting circuit is responsive to the Q1 true and QIN control signals 126 and 128 for clocking of the differential current amplifiers in the driver and power setting circuit 102. Likewise, the B coefficient setting circuit is responsive to Q4 true and Q4N control signals 130 and 132 for power setting amplifier clocking purposes. The A circuit 118 is also responsive to a power down signal 134 identified as AIP. The B circuit 126 is responsive to a power down circuit 136 designated BiP. The power down signals 134 and 136 are provided by the power down logic of FIG. 9 as will be explained in more detail hereinafter. The A coefficient and B coefficient circuits alter the transfer function of the filter 116 to adjust the output of the driver 102 to match the inverse of the transmission line frequency response and reduce 151. The filter coefficients are alterable in arbitrarily small increments and matched to others to adapt to the power setting circuit to a variety of transmission media.

Self-induced ISI in the driver 102 is compensated by a A-coefficient level driver compensation circuit 138 and a B coefficient level driver compensation circuit 140 coupled to a driver summing node 141 for the driver 102. The A compensation level circuit is responsive to the mirror current supplying 104 and the A1, A2, and A4 control signals 122. Likewise, the B compensation level circuit 140 is responsive to the current mirror supply and the B1, B2 and B4 control signals 124. The operation of the compensation circuits 138 and 140 will be described in conjunction with FIGS. 8 and 8A.

The circuit 102 provides the main differential output current drive, which is not delayed by the FIR shift register. The subsequent (delayed) switched current sources provide reduction of the current output level when consecutive bits remain in the one or zero level at the Q1, Q1n, Q2, Q2N and Q4, Q4N (See FIGS. 4 and 7) control signal terminals. The circuit is programmable using programmable input control signals A1, A2, A3 and B1, B2, and B3 to enable one or more current reductions depending upon the amount of pre-distortion that is selected. The global output current level is set by current mirrors formed by the switched diode connected transistors 209, 211, 213, 215 in the power setting circuit and the current sources in the respective output current amplifiers. When power down is activated, bias circuit, to be described in conjunction with FIG. 3, is switched off and the output current source transistor 217 is switched off providing a high impedance path to ground.

Figure 3:
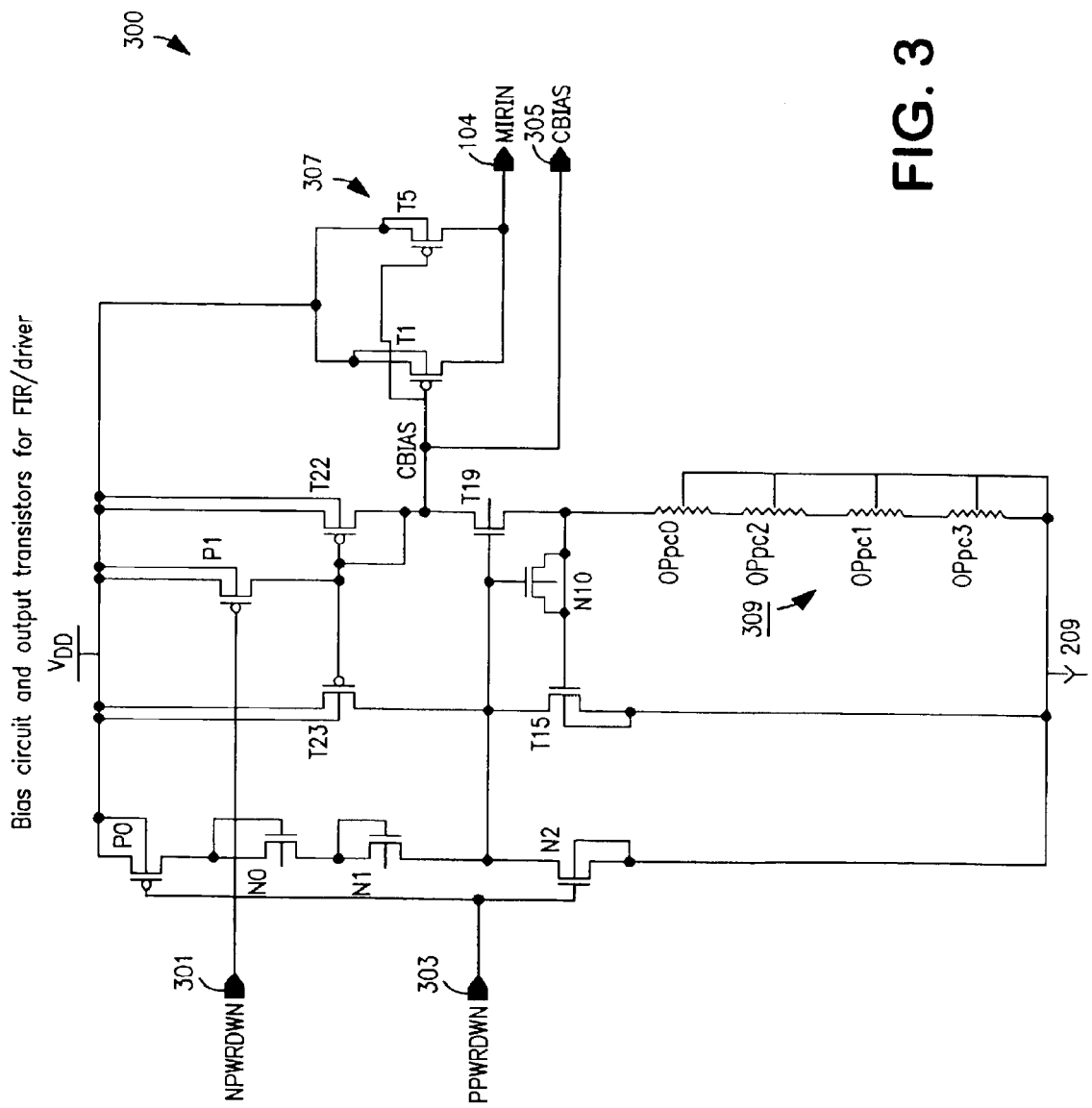
FIG. 3 is a bias circuit for the programmable driver of FIG. 1.

In FIG. 3, a bias circuit 300 responsive to a power down signal 301 and a power in signal 303 provides an output as the current mirror supply 104 and a bias supply 305. The bias supply is provided to storage circuits included in the filter 116 (to be described in conjunction with FIG. 4). The power down signal at 301 operates transistor P1 and T22 to alter a bias voltage for a current supply 307 connected to the mirror end terminal 104 and the bias terminal 305. A signal at the power in terminal 303 controls a voltage divider 309 to select the appropriate voltage for bias terminal 305 and the input to the current circuit 307. The bias circuit 300 is of the type including feedback to set a voltage that is labeled CBIAS. The CBIAS signal provides a biasing voltage to the gates of P-channel transistors. These form a mirroring circuit that supplies a controlled current as a reference to the output current source mirrors in the driver.

Figure 2:
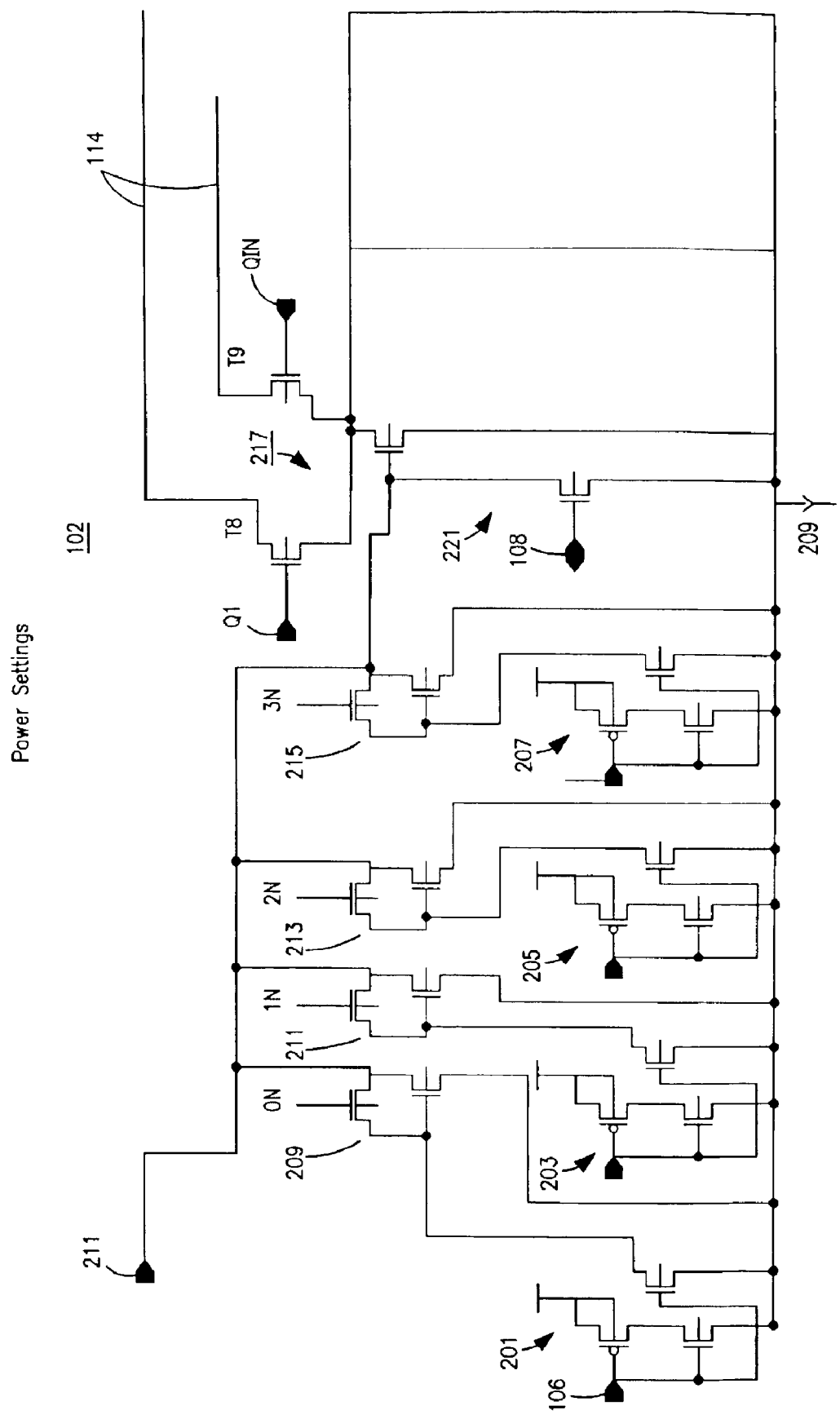
FIG. 2 is a circuit diagram of the driver and power setting stage in FIG. 1.
Figure 4:
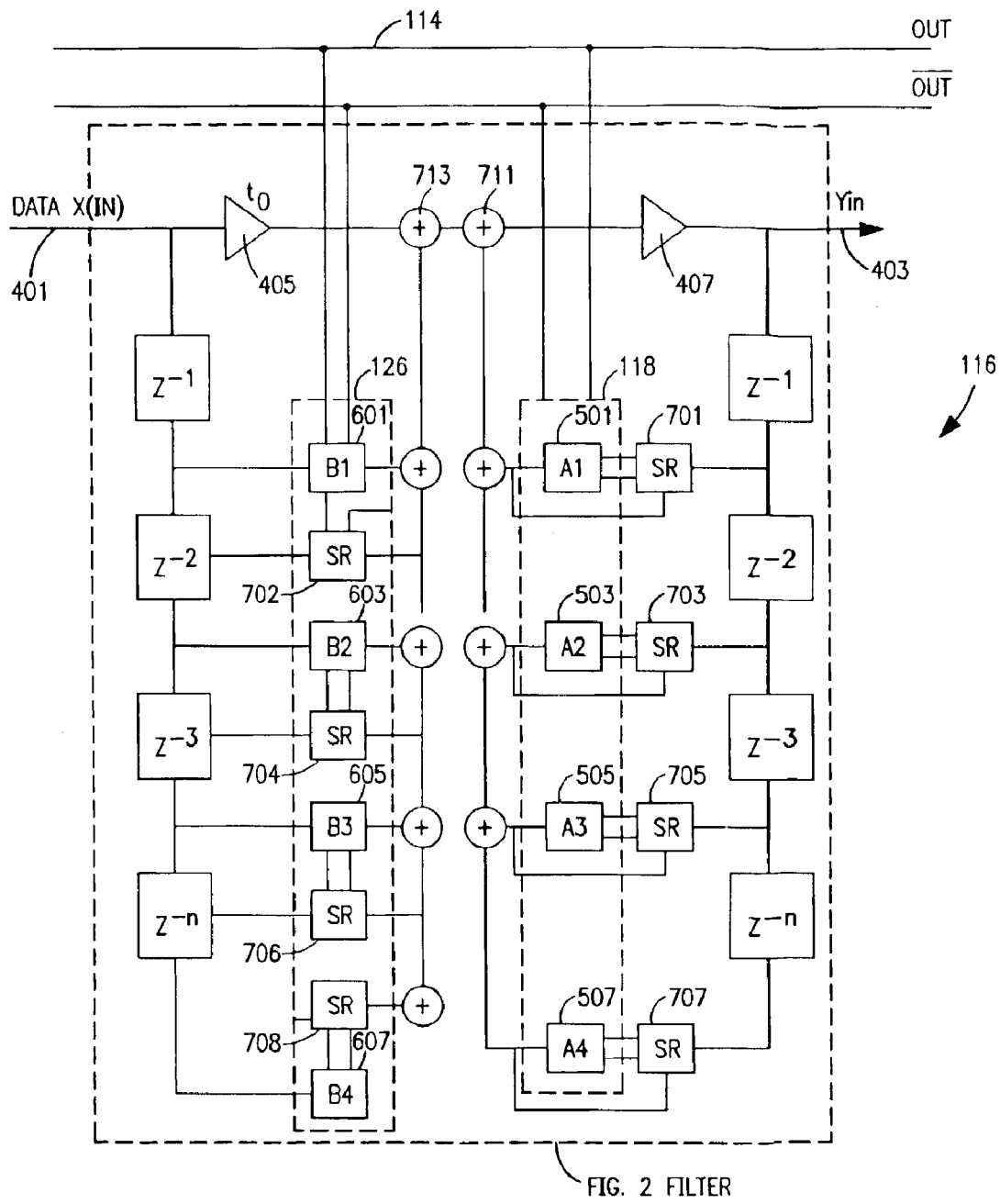
FIG. 4 is a representation of a Finite Impulse Response filter circuit incorporated in FIG. 1.

In FIG. 4, the FIR filter 116 includes the A coefficient setting circuit 118 and the B coefficient circuit 126, both connected to the transmission line 114. Each coefficient setting circuit has a series of cascaded Z delay stages to be explained in more detail in connection with FIGS. 5 and 6. The A coefficient setting circuit 118 includes stages 501, 503, 505 and 507, each stage providing unit delay $Z^N$. The B coefficient setting circuit 126 includes stages 601, 603, 605, and 607, each stage providing unit delay $Z^N$. Obviously, the A and B circuits can comprise more or less stages depending on the characteristics of the transmission line 114. Each A coefficient setting stage 501 . . . 507 is linked to a three stage shift register 701, 703, and 705, 707 which provide control signals Q2 and Q2N to the coefficient setting circuits 501, . . . 507. Likewise, The B coefficient setting stages 601 . . . 607 are linked to 3 stage shift register 702, 704, 706 and 708 which provide control signals Q2,4, Q4N to B coefficient setting circuits 601 . . . 607. True complement controls signals Q1 and Q1N are generated in one stage of each shift register and provided to the power setting circuit shown in FIG. 2. The shift registers will be described in conjunction with FIGS. 7A, 7B, and 7C. A data signal 401 is fed to each shift register in cascade which create the delay increments $Z^{-1}$, . . . , $Z^{-n}$ for the A and B coefficient setting circuits. A data output 711 is taken from the A coefficient setting circuits at terminal 403. Amplifiers 405 and 407 are included in the data circuit to create the initial delay unit $Z^{-1}$. The present output of each storage circuit equals its preceding input. The filter transfer function is of the general form of $H(Z) = AB_0 + AB_1 Z^{-1} + BA_2 Z^{-2} + AB_n Z^{-n}$. The numerical values of the A and B coefficients are set by input values to the A and B coefficient setting circuits. A determining factor for the values of the A and B coefficients include the characteristics of the transmission media, the speed of transmission, the type of back plane and the type of chip packages connected to the backplane. The general details of the Z transform for filter 116 are described in the text both "Introductory Digital Signal Processing with Computer Applications" by Paul A. Lind et al., published by John Wiley & Sons, New York, N.Y., May 1990 (ISBN 0471915645) PBK, Chapters 4 and 5, which are fully incorporated herein by reference.

Figure 5:
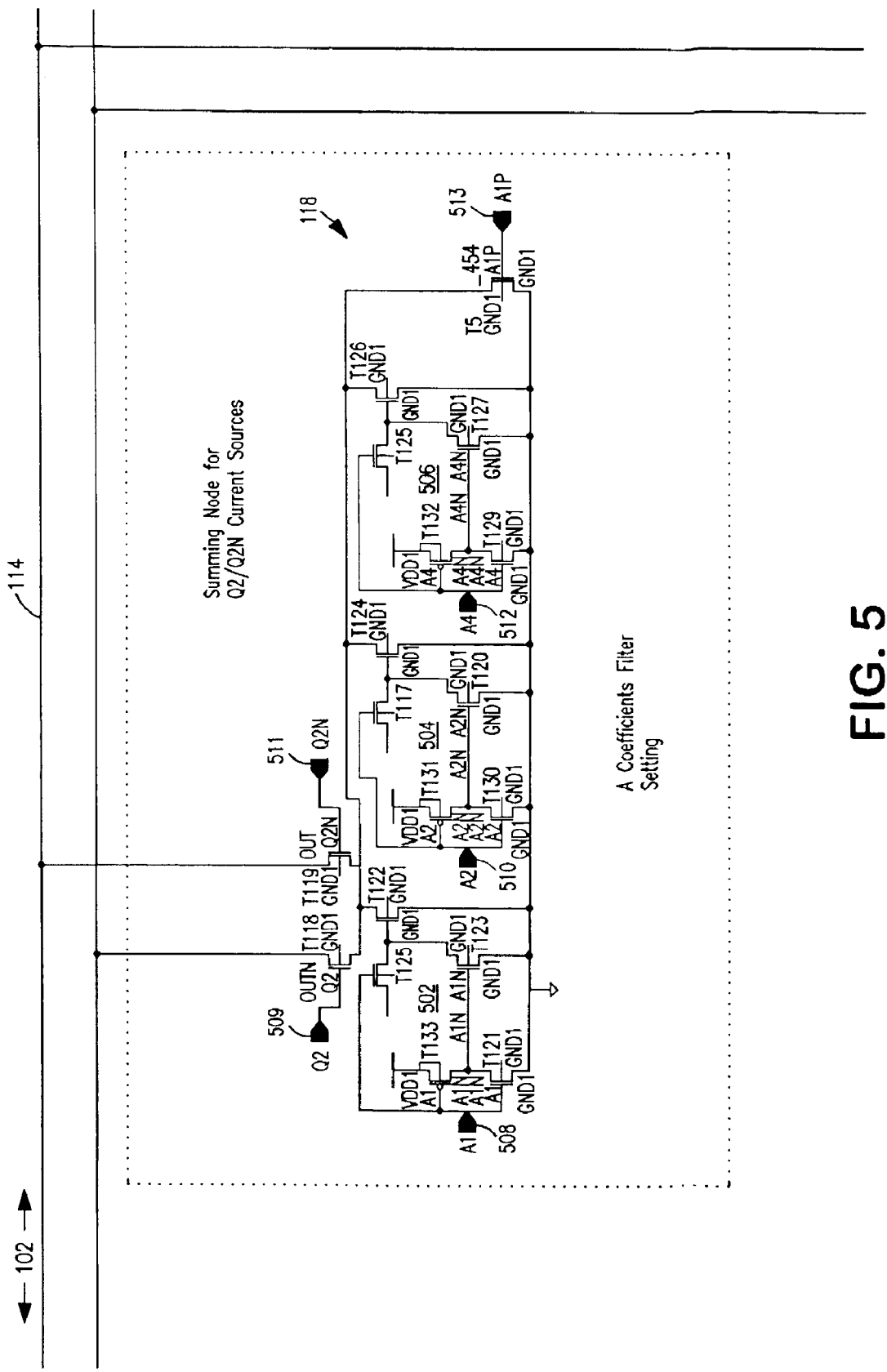
FIG. 5 is a circuit diagram of the A coefficient filter setting circuit incorporated in FIGS. 1 and 4.

In FIG. 5, the A coefficient setting circuit 118 is coupled to the transmission lines 114 and includes coefficient stages 501, 503, and 505, responsive to control signal A1 at terminal 502; control signal A2 at terminal 504, and control signal A4 at terminal 506. The programmable input control signals A1, A2, A4 in conjunction with Q2 and Q2N control signals at terminals 509 and 511 alter the output of both sides of the differential signal appearing on the transmission lines 114. The effect of the control signal or coefficients is to modify the frequency response of the driver according to the H (Z) transfer function.

The circuit operation for the A coefficient setting is as follows. Current sources which, when summed together form the total current for a particular coefficient of one of the delayed Finite Impulse Response (FIR) delayed bits (represented as Q2/Q2N), are switched on by connecting the mirror voltage, MIRIN, to the gate node of each of the current sources which represent coefficients. When a particular current source transistor is not in use the gate of this current source is grounded by turning on a transistor T120, T123 and T127 whose source is connected to ground. The grounding insures no current flow in this state and effectively switches off the particular current source to adjust the coefficient.

A power down signal AIP is received at the terminal 513 which is generated in the logic circuit shown in FIG. 8 to be described hereinafter. A power down signal switches the driver current off the high capacitance nodes in the circuit when the control coefficients A, A1, A2, and A3 are inactive. By switching off the high capacitance nodes in the circuit, the bandwidth of the output stage of the driver circuit is increased which reduces intersymbol interference in the transmission system.

Figure 6:
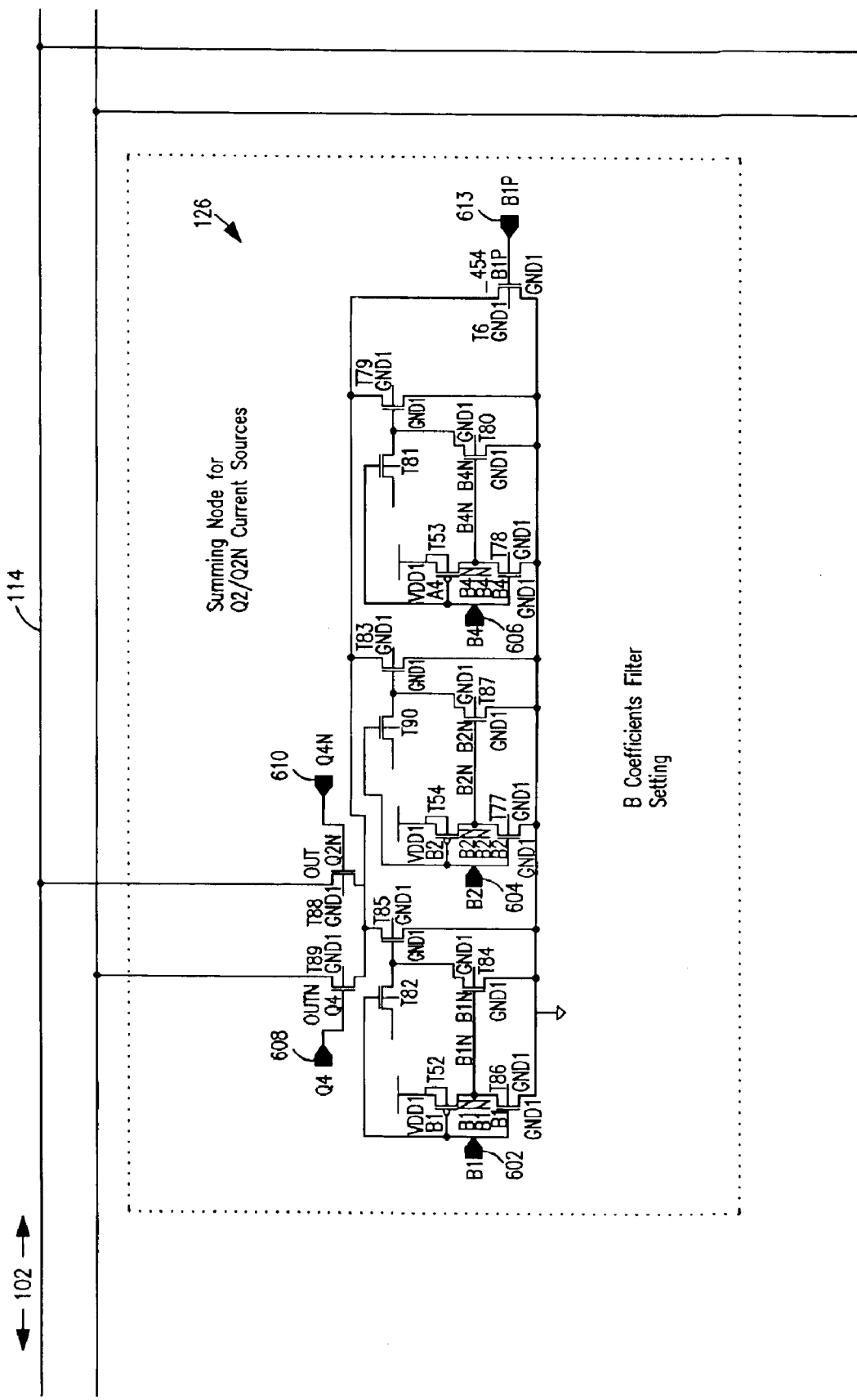
FIG. 6 is a circuit diagram of the B coefficient filter setting circuit incorporated in FIGS. 1 and 4.

In FIG. 6, the B coefficient driver setting circuit 126 is responsive to programmable input control signals B1 at terminal 601; B2 at terminal 603; and B4 at 605. The input control signals in conjunction with Q4 and Q4N control signals at terminal 607 and 609, respectively, will alter the output of the driver 102 in accordance with the change to the B coefficients of filter H (Z) transfer function. A terminal 613 receives a power down signal VIP from the logic circuit in FIG. 8 for switching the circuit off the high capacitance nodes when the B coefficients are inactive.

The circuit operation for the B coefficient setting is as follows. Current sources which, when summed together form the total current for a particular coefficient of one of the delayed Finite Impulse Response (FIR) delayed bits (represented as Q4/Q4N), are switched on by connecting the mirror voltage, MIRIN, to the gate node of each of the current sources which represent coefficients. When a particular current source transistor is not in use the gate of this current source is grounded by turning on a transistor T80, T84, and T87 whose source is connected to ground. The grounding ensures no current flow in this state, and effectively switches off the particular current source to adjust the coefficient.

Figure 7:
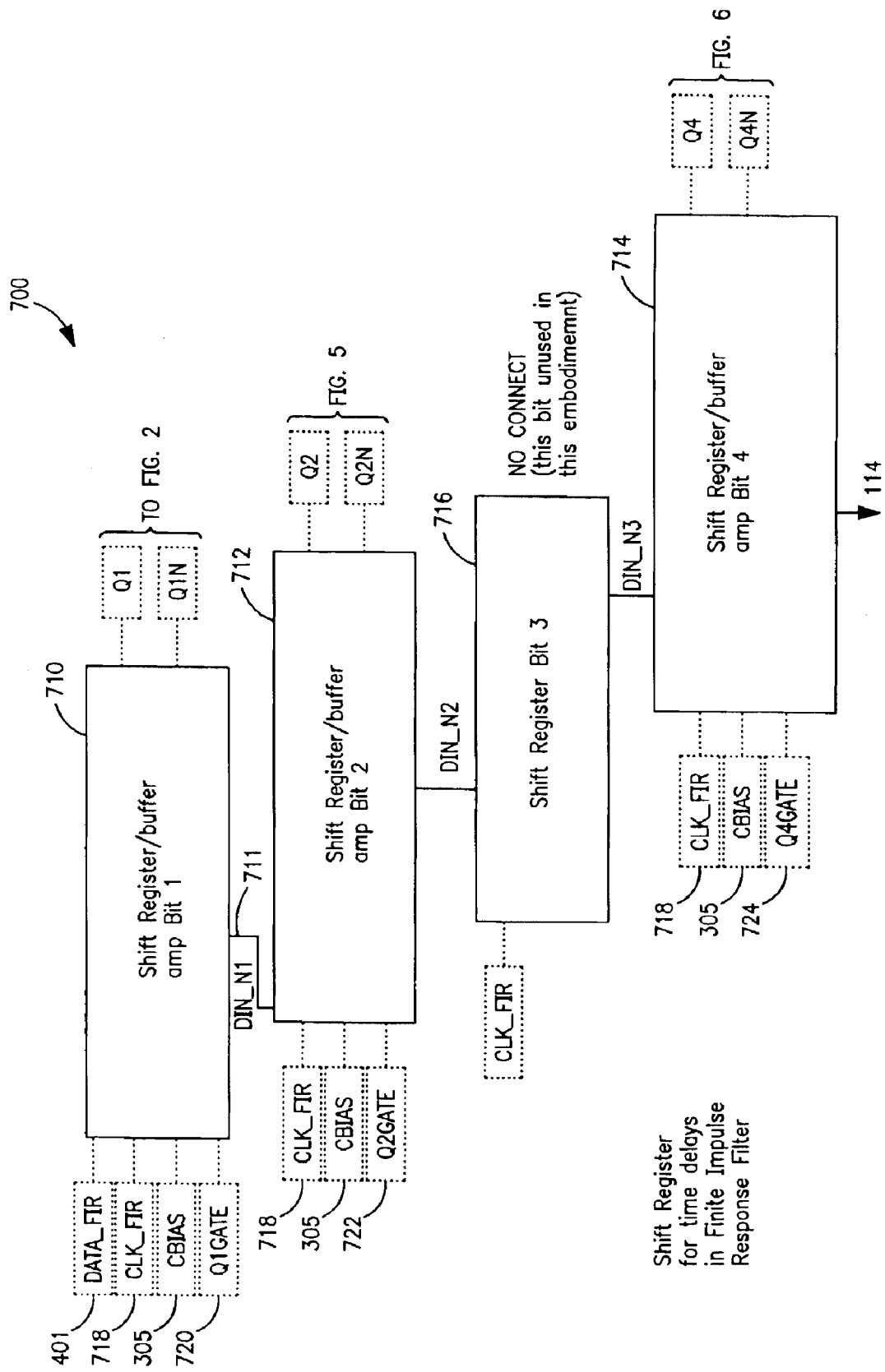
FIG. 7 is a block diagram of a shift register for time delays in the Finite Impulse Response (FIR) filter of FIG. 4.

In FIG. 7, a representative shift register stage 700 is shown for each shift register 701 . . . 707 included in the FIR filter 116 shown in FIG. 4. The shift register contains three stages: 710, 712, and 714. This shift register also contains additional stages: 716, which may be used in other embodiments. The shift register contains the current outgoing data bit and a history of previous data bits, and provides the Z time delays for the FIR filter 116. Stage 1 of the shift register is responsive to the data signal 401 provided to the FIR filter. The stage 710 is also responsive to a clock signal 718 (not shown) generated for the FIR; the C bias signal 305 (see FIG. 2) and a Q1 gating signal 720. The Q1 and Q1N (true/compliment) control signals provided to the driver 102 (see FIG. 2) are also provided as an input to the stage 710. The data output 711, 713 (See FIG. 4) is provided to stage 712, which receives the clock signal 718, the C-bias signal 305 and a Q2 gate signal 722. The stage 712 is responsive to Q2 and Q2N control signals also provided to the A coefficient setting circuit. The output of the stage 712 is provided as an input to the stage 714, which receives the clock signal 718, the bias signal 305 and a Q4 gating signal 724. The Q4 and Q4N control signal provided to the B coefficient setting circuit are also provided to the stage 714. The output of the stage 714 is provided to the transmission line 114. The shift register stages 710, 712 and 714, form the time delays $Z^{-1}$, $Z^{-2}$ and $Z^{-3}$ for the H (Z) transfer function of the driver 102 which matches the inverse of the transmission media.

Figure 7A:
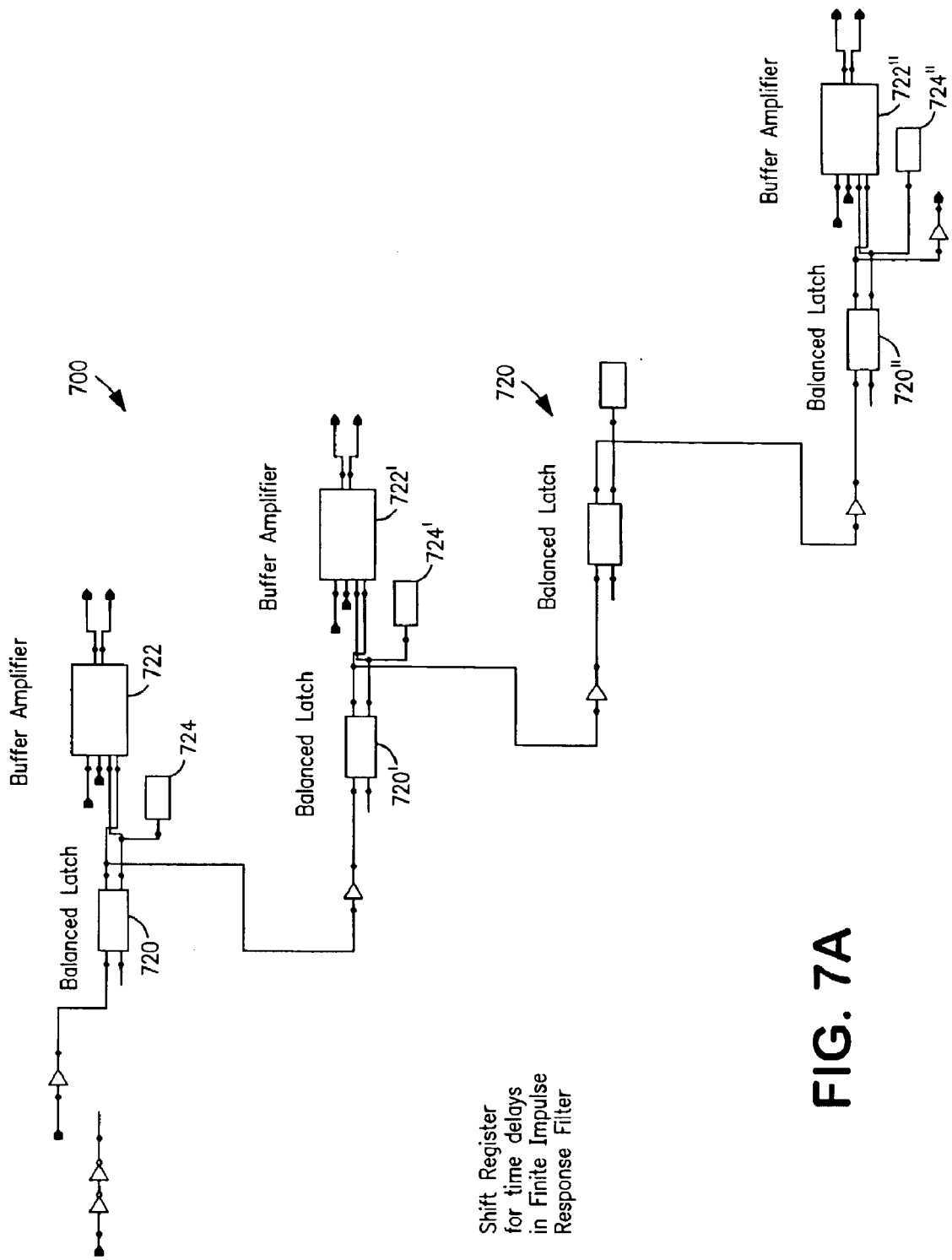
FIG. 7A is a circuit diagram of a shift register stage in FIG. 7.

FIG. 7 depicts four shift register stages, three of which are connected to buffer amplifiers to be described in conjunction with FIG. 7A. The transfer function being created uses the Q1/Q1N bit, the Q2/Q2N bit, and the Q4/Q4N bit. The signal at the output of each of the shift register bits is converted to a differential signal by the buffer amplifier and buffered so that it is able to drive the final current source output stage. The transfer function is implemented by the selective addition or subtraction of the coefficient current which enables the removal of energy from the wider data pulses while not removing energy from the narrower data pulses. The selective addition or subtraction of coefficient current acts to reverse the effects of the transmission line which attenuates lower frequencies to a lesser extent than higher frequencies (characteristic of an alternate 1, 0 pattern).

In FIG. 7A, a representative shift register stage 700 includes a balanced latch 720 and a buffer amplifier 722, in each successive stage of the shift register. The balanced latch and buffer amplifier in each stage interact to store the current data pulse and two preceding data pulses. As each data pulse is received, the stored data pulse is shifted out to the next stage and the stage provides the delayed pulse at the ON and OFF terminals of the stage 722" to the transmission line. A buffer 724 stores the data pulse while transferring from one stage to the next. The balanced latch provides the clocked delay as well as the conversion to differential signals to drive the buffer amplifier.

Figure 7B:
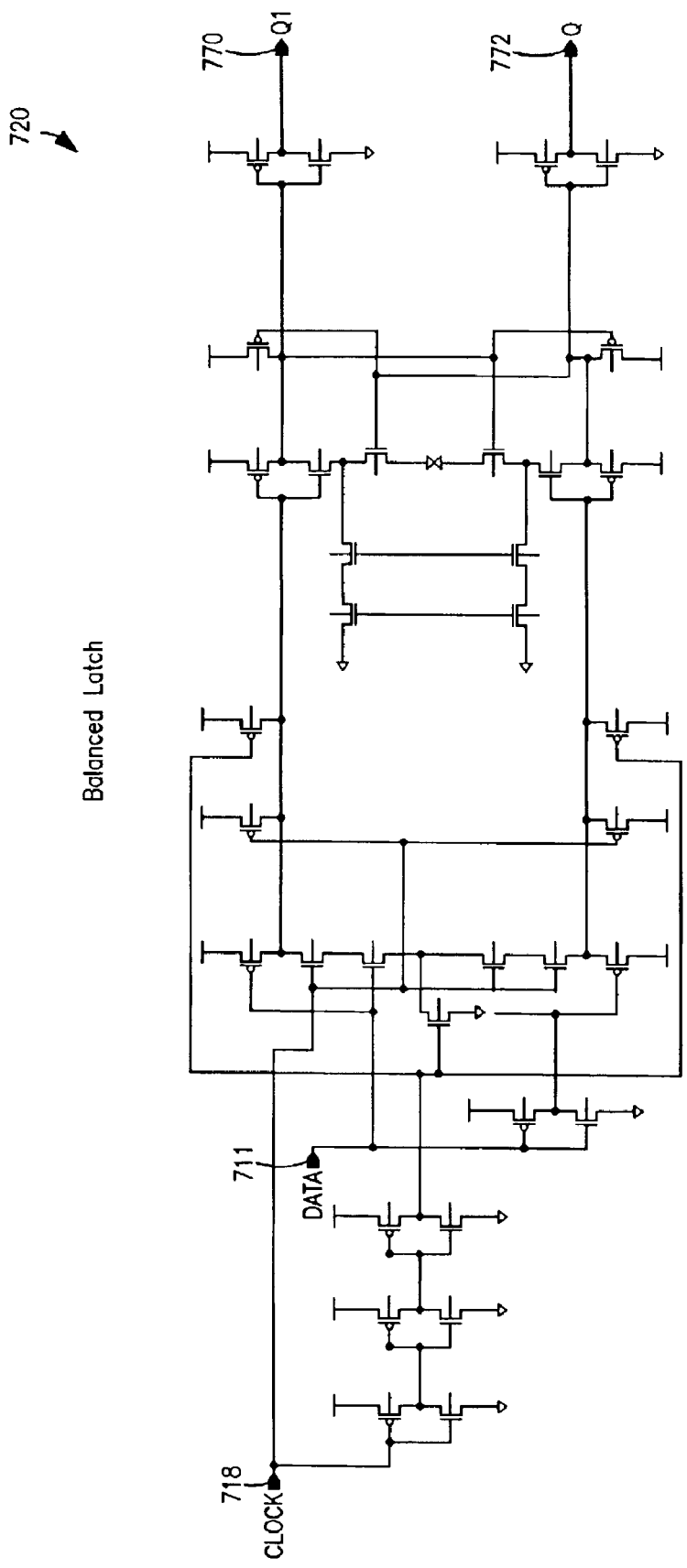
FIG. 7B is a circuit diagram of a balanced latch included in the circuit diagram of FIG. 7A.

In FIG. 7B, the balanced latch 720 is shown as receiving the data at terminals 711, 713. The latch transfers the data signal to the buffer amplifier at terminals 770 and 772 when the clock signal is activated at terminal 718. Before the buffer amplifier accepts the next current pulse, the stored current pulse is transferred to buffer 724 (see FIG. 7A) for subsequent transmission to the next stage of the shift register. The operation of the balanced latch is as follows: The balanced feedback latch takes the inputs of data and clock and changes the state of the latch output depending on the data state. The latch output stage is a buffer stage to facilitate driving the buffer amplifier.

Figure 7C:
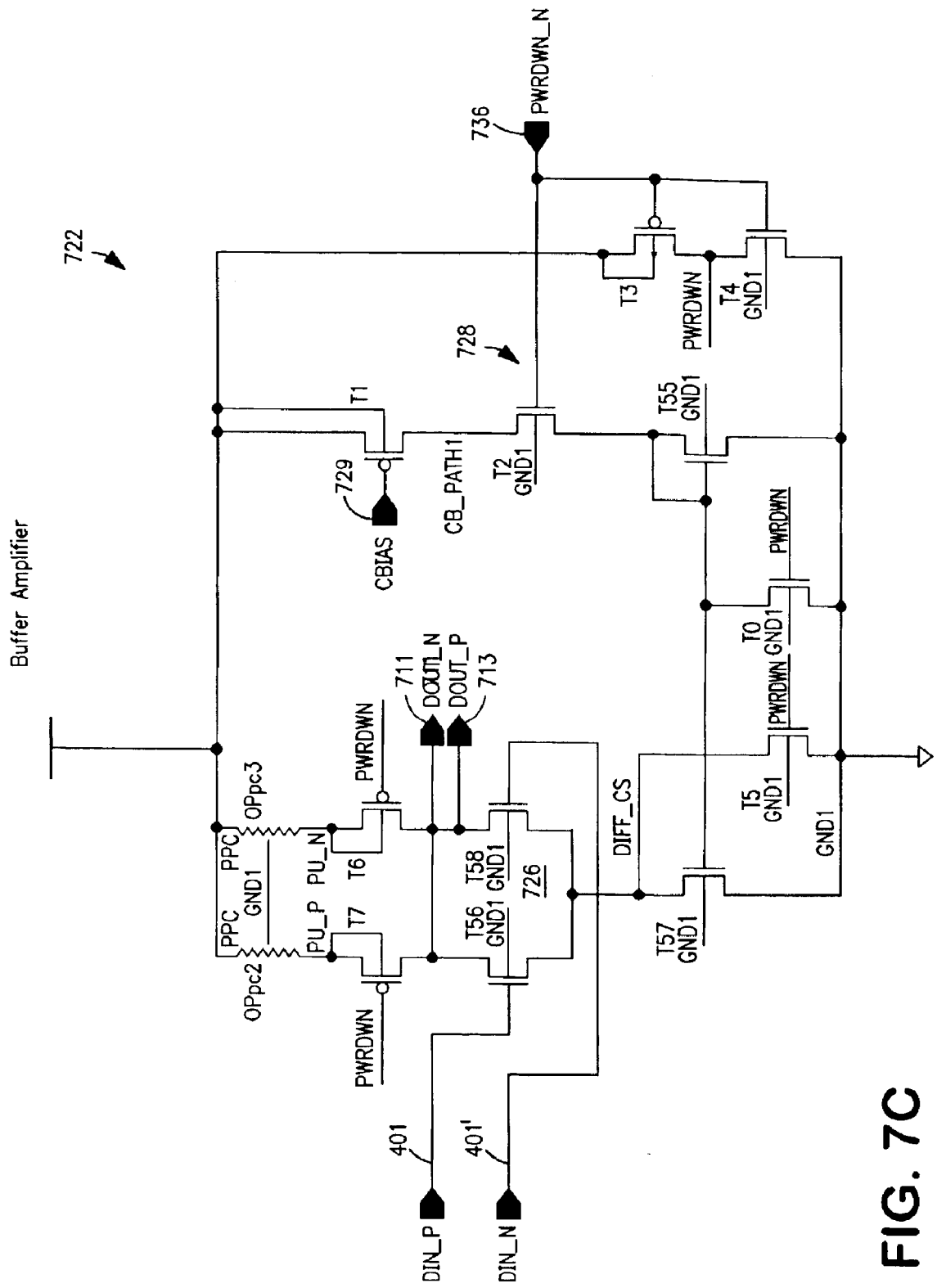
FIG. 7C is a circuit diagram of a buffer amplifier included in the shift register of FIG. 7.

FIG. 7C shows the buffer amplifier 722 for storing the data pulse. Terminals 401 and 401' receive the data pulse, which is provided to a differential current amplifier 726 comprising transistors T56 and T58. The stored data pulse in the amplifier 726 is transmitted to the next stage at output terminal 711 and 713 when the next pulse is received from the balanced latch. A power down circuit 728 is biased C-bias 305 at terminal 729 and receives an input from a powerdown signal at terminal 736. The powerdown signal is generated in the logic circuit shown in FIG. 8 to be described hereinafter. When the powerdown signal is present, the current flow in the differential amplifier is reduced to lower intersymbol interference on the transmission line. The circuits 722 provides sufficient drive capability with sufficient bandwidth to drive the driver output's differential pairs of transistors.

Figure 8:
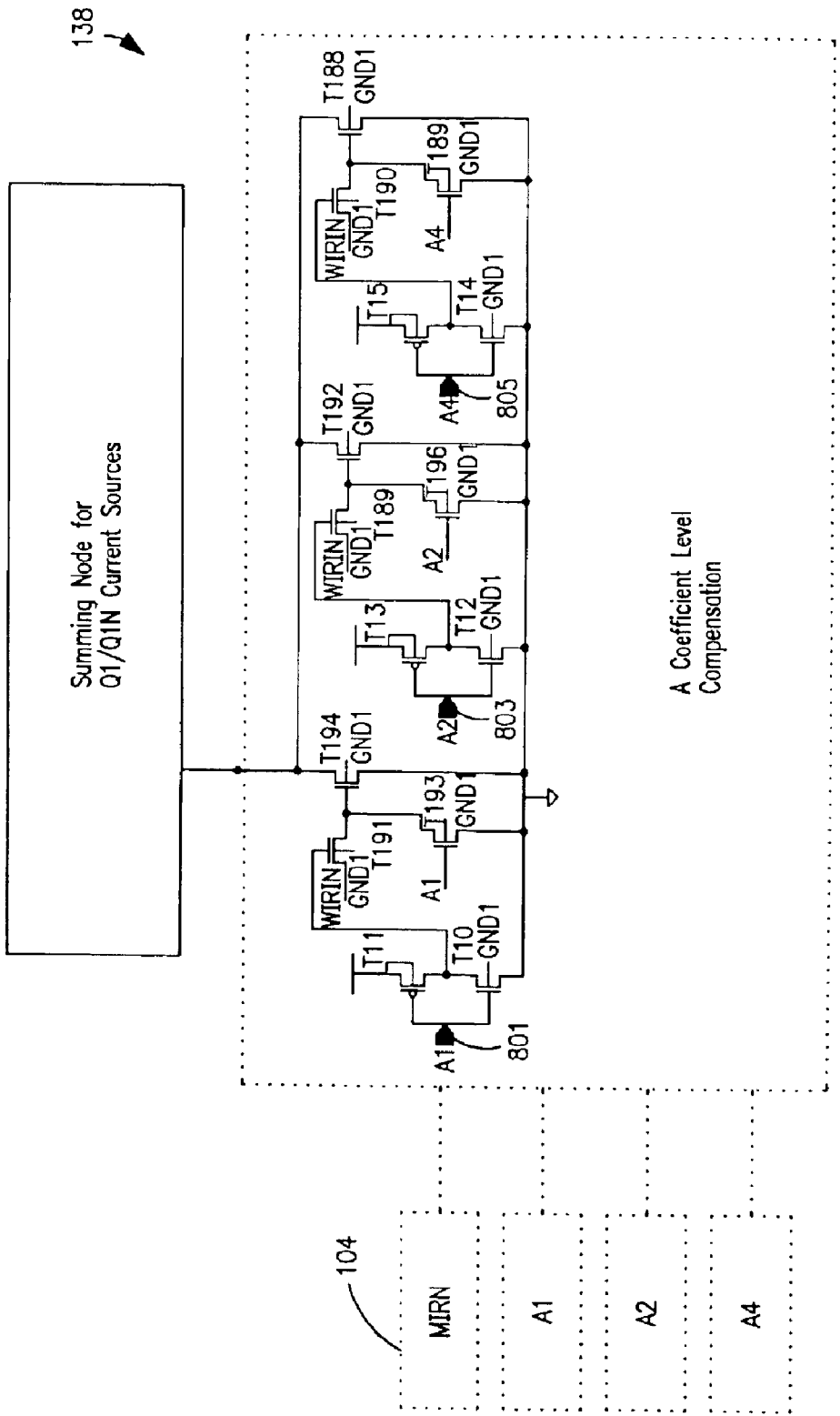
FIG. 8 is a circuit diagram of an A coefficient level driver compensation circuit for the driver of FIG. 2.
Figure 8A:
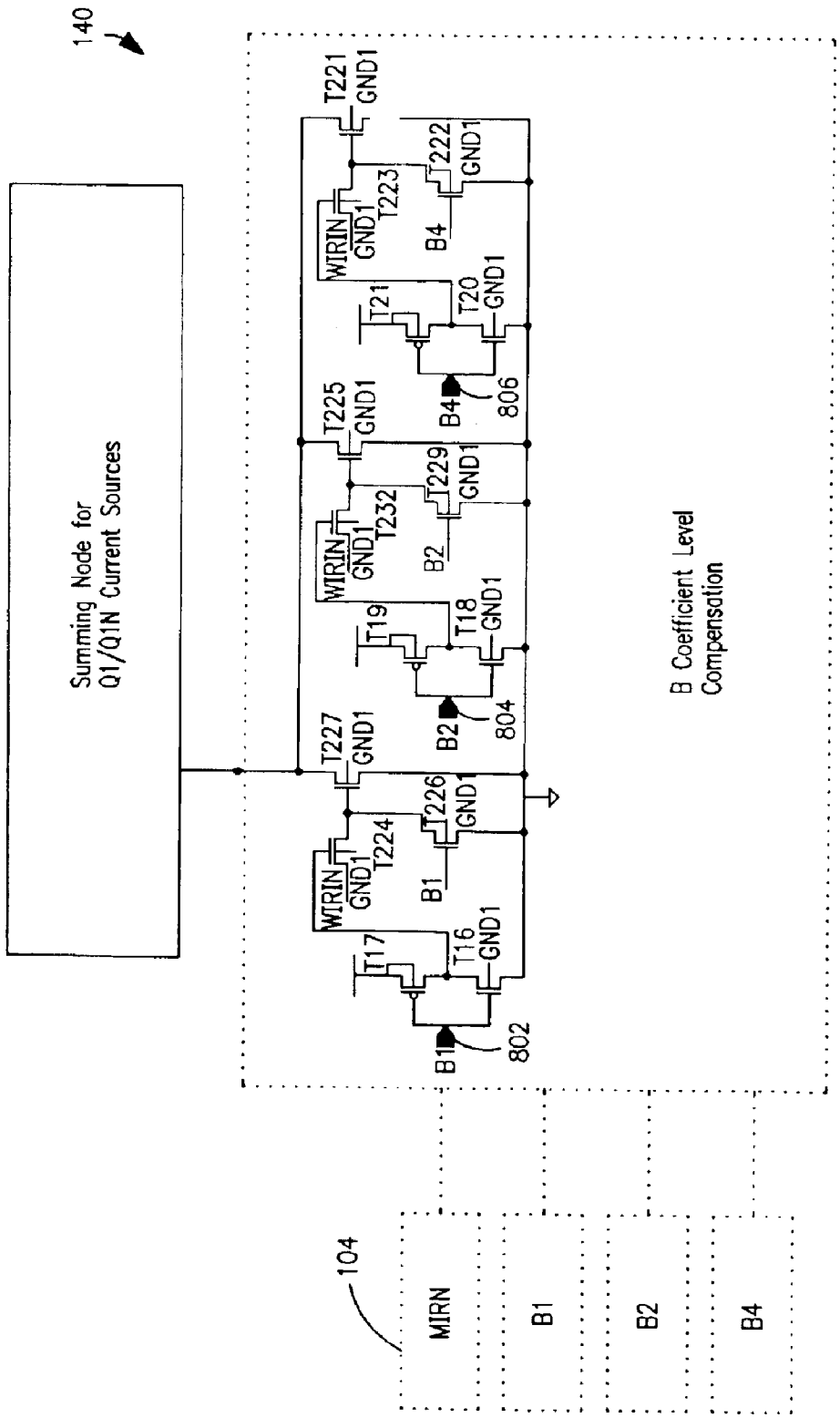
FIG. 8A is a circuit diagram of a B coefficient level driver compensation circuit for the driver of FIG. 2.

In FIG. 8, the coefficient level compensation circuit 138 assists in the elimination of driver-induced intersymbol interference. The circuit 138 includes three stages, each stage responsive to a programmable control pulse A1 at terminal 801; A2 at terminal 803; and A4 at terminal 805. The control signals A2 and A4 are the same as provided to the A coefficient setting circuit 118. Mirror current supply 104 is also provided as an input to each stage. The control signals in combination with the Q1, Q1N (true/complement) control signals provided to the driver, function to alter the current on the transmission line 114 provided by the current amplifier 217 shown in FIG. 2. By lowering the driver current, the induced intersymbol interference is reduced and the bandwidth increased.

Figure 9:
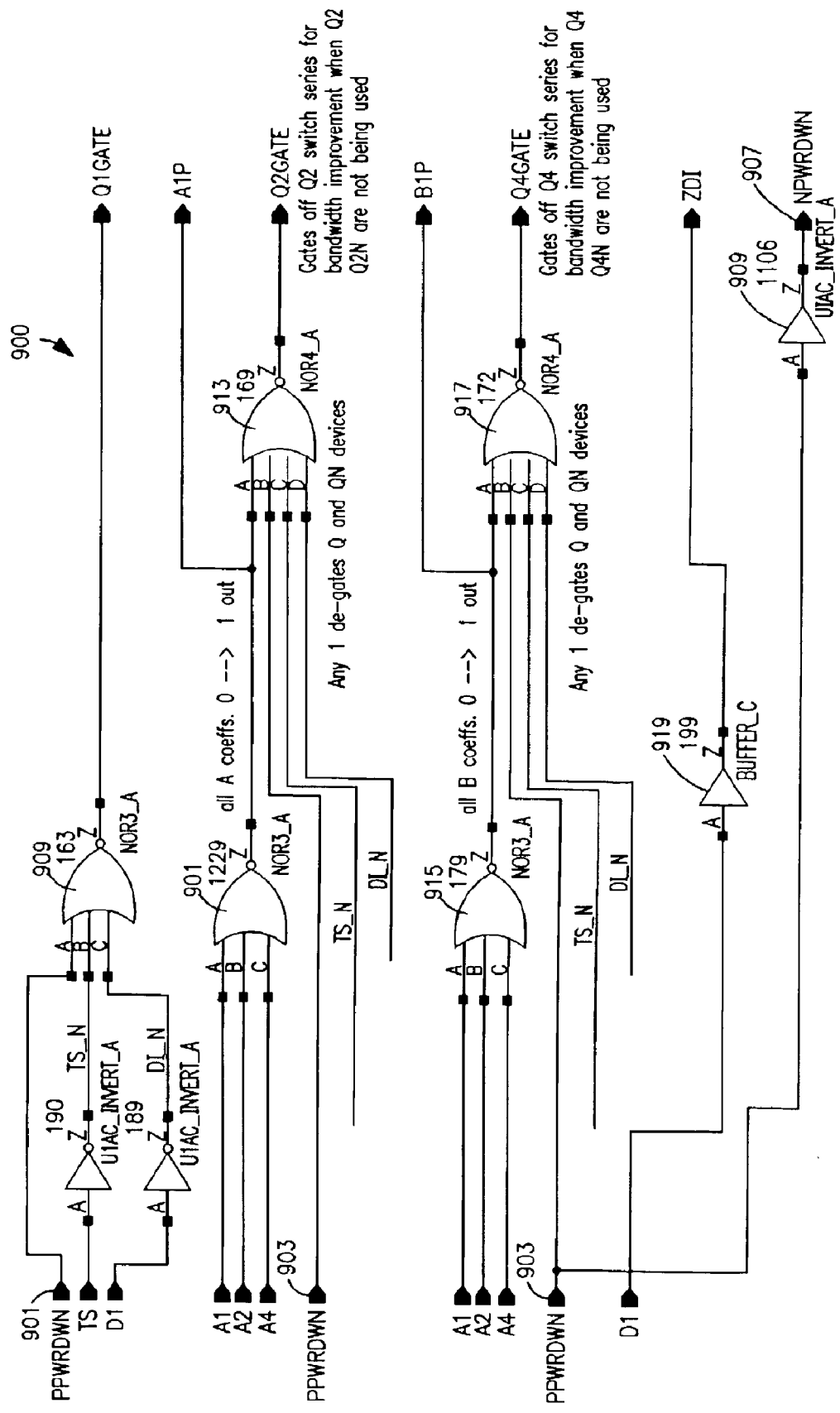
FIG. 9 is a logic diagram for powering "off" the programmable driver equalizer of FIG. 1.

In FIG. 9, a powerdown and gating circuit 900 receives the positive powerdown signals 901, 903 and 905. A negative powerdown signal 907 is generated from the powerdown signal 905 by way of an inverter 909. The power down signal, PPWRDWN is used by the logic to condition the outputs Q1GATE, Q2GATE, AND Q4GATE to ground when power down is activated. The power down is used to switch off the transistor switches in the final output stage of the driver/equalizer. The negative power down signal is used by the aforementioned bias circuit. The Powerdown signal 901 is provided to a NOR circuit 909 along with a data signal D1 which is inverted and a timing signal, TS, which is also inserted. The output of the NOR circuit 709 is provided as the gating signal Q1 to the shift register 710 (see FIG. 7). The control signals A1, A2 and A4 are provided to a NOR circuit 911. The output of the NOR circuit 911 is provided as one input to a NOR circuit 913 responsive to the powerdown circuit 903, a time signal TS, and a data in signal, DIN. The output of the NOR circuit 913 is provided as the Q-to-gate signal for the second stage of the shift register 700 shown in FIG. 7. The A input signal is also provided as an output to an AIP signal which is provided to the A coefficient setting circuit for powerdown purposes. Coefficients B1, B2, B4 are provided to NOR gate 915 and the output is provided to NOR 917 along with the powerdown signal 905, a timing signal, TS, and a data in signal, D1. The output of the NOR circuit is provided as the Q4 gate signal to the third stage of the shift register shown in FIG. 7. The data in signal D1 is provided to a buffer, the output of which is provided as a ZD1 signal. The logic circuit provides improved performance of the driver/equalizer by sensing when all of the coefficients (ex. A1, A2, A4) are zero. In this case the Q2GATE or Q4GATE signal is pulled to ground in turn grounding the outputs of the buffer/amplifier. The grounding will switch off the output transistors (differential switch pair) in the unused coefficients. Turning off the output transistors acts to reduce the driver's self-induced intersymbol interference (ISI) by reducing the output capacitive loading.

Figure 10:
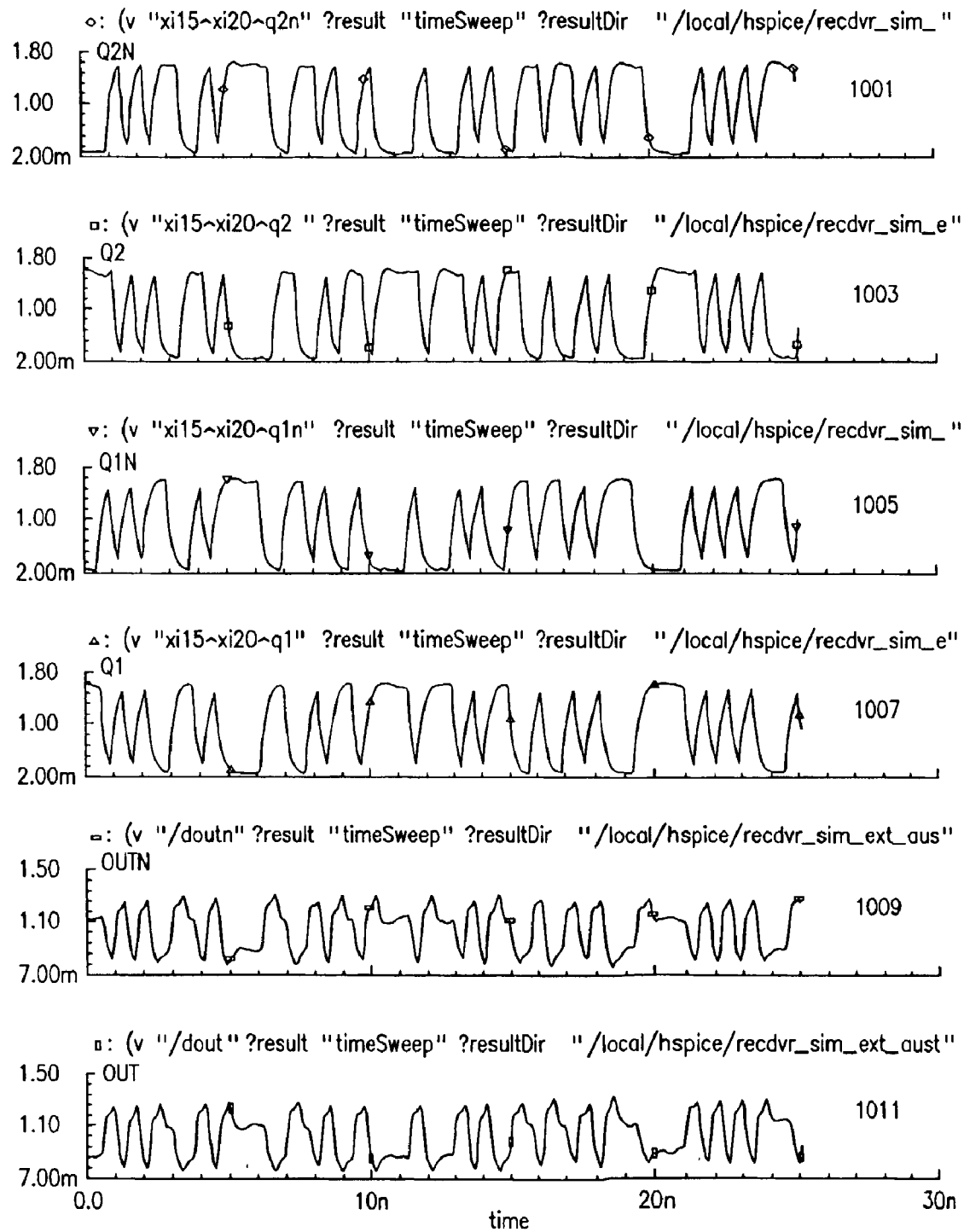
FIG. 10 is a timing diagram for Q and QN bar (true and complement) signals for output signals OUT and OUTN bar on the transmission media of FIG. 1.

FIG. 10 shows signal traces 1001 and 1003 vs. time for the Q2 and Q2N (true/complement) signals applied to the second stage shift register shown in FIG. 7. Signal traces 1005 and 1007 vs. time are shown for the Q1N and true Q1 signals applied to the current amplifier 217 in the driver and power setting circuit 102 (FIG. 2) and to the shift register stage 710 shown in FIG. 7. Signal traces 1009 and 1011 are shown for OUT and the OUTN on the transmission line in the presence of the Q1 and Q1N signals. The signal traces for the Q4 and Q4N gating are of the same form as Q1, Q1N, and Q2, Q2N, adjusted time wise, and are not shown for purposes of brevity.

FIG. 10 depicts the Q2, Q2N, Q1, Q1N, OUT, and OUTN signals for a random data pattern. Q1 and Q1N, for example, are driving the final output stage with patterns which are appropriate for the data pattern being sent.

Figure 11:
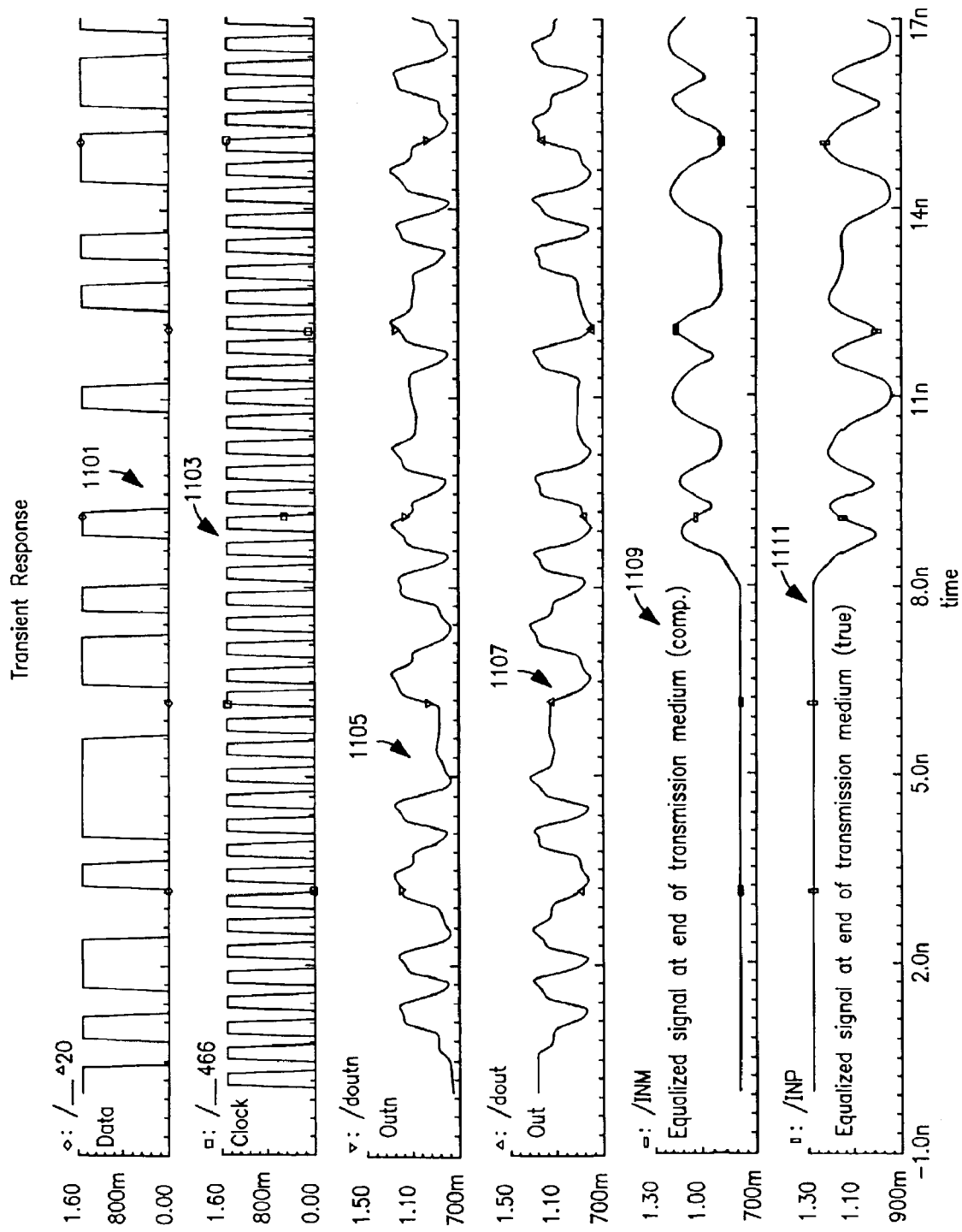
FIG. 11 is a timing diagram for data, clock output signals OUT and OUTN bar and equalized signals at the end of a transmission medium for the programmable driver equalizer of FIG. 1.

In FIG. 11, signal traces 1101 and 1103 describe the data and clocking signals vs. time provided to the shift register stage 710 in FIG. 7. Signal traces 1105 and 1107 describe the signal levels vs. time for the transmission lines 114 in the absence of the controllable FIR filter 116. Signal traces 1109 and 1111 show the equalized signal at the end of the transmission line vs. time for the transmission line 114 as adjusted by the controllable FIR filter.

When data and clock are fed to the driver, the signals produced at the immediate true and compliment driver outputs are depicted as OUT and OUTN. The waveform shown exhibits the lower amplitude after one bit time for the longer pulses at the input to the transmission medium. The equalized data patterns are shown as INM and INP which are the signals which appear after the transmission medium and at the input to a receiver circuit. The equalized signal has much more constant amplitude than would a non-equalized signal.

A constant peak amplitude, regardless of coefficient setting, is achieved as follows. When a coefficient is activated, it will add to the current sinking capability of the driver when, due to the specific data pattern, it happens to phase align with the time zero (main) current source. In this case the actual peak amplitude of the signal will occur when all of the Q's and QN's happen to line up. The A and B coefficient level driver compensation circuit subtract out exactly the amount of current from the main current source as the active coefficients are using. By using the logic to control the A and B coefficient setting circuits and the A and B coefficient level driver compensation circuits, the maximum current sum at any given time of the currents through either the true or compliment line output is held to a constant amplitude regardless of coefficient setting, for a given power level setting.

While the invention has been shown and described in a preferred embodiment, various changes can be made without the departing from the spirit and scope of the invention as defined in the appended claims, in which:

I claim:

1. A programmable driver/equalizer for overcoming InterSymbol Interference (ISI) and other transmission impairments in a variety of transmission media, comprising:
    (a) a controllable driver set coupled to a transmission media and including compensation means compensating for self-induced ISI;
    (b) a transversal filter receiving a data input signal and coupled to the transmission media, the filter having programmable filter coefficients sets; and
    (c) means for altering the frequency response of the controllable driver set, based on a Z transform, to match the inverse of the frequency response of the transmission media.

2. The programmable driver equalizer of claim 1 further comprising:
    (d) means including the compensation means providing constant output peak amplitude on the transmission media independent of the programmable filter coefficients.

3. The programmable driver/equalizer of claim 1 further comprising:
    (d) logic means for switching the transversal filter and controllable drivers off high capacitance nodes when the programmable filter coefficients are inactive.

4. The programmable driver/equalizer of claim 1 further comprising:
    (d) means for reducing the (ISI) of the controllable driver set when the programmable filter coefficient are active.

5. The programmable driver/equalizer of claim 1 further comprising:
    (d) means responsive to the programmable filter coefficients sets, each providing control signals for matching the controllable driver set output to the inverse of the transmission media.

6. The programmable driver/equalizer of claim 1 further comprising:
    (d) means for storing a present data input signal bit and a history of at least two past data signal input bits in the transversal filter.

7. The programmable driver/equalizer of claim 1 further comprising:
    (d) three stage shift register elements in the transversal filter providing time delays in processing the data input signal.

8. The programmable driver/equalizer of claim 1 further comprising:
    (d) buffer and latch means in each stage of a 3 stage shift register in the transversal filter for storing data input signals in time sequence.

9. The programmable driver/equalizer of claim 1 wherein the transversal filter is described by $H(Z)=Ab_0+Ab_1Z^{-2}+AB_2Z^{-2}+ \ldots AB_nZ^{-n}$ where numerical value of the coefficients are set by register values in A and B coefficient selling circuits connected to the transmission line.

10. The programmable driver/equalizer of claim 1 wherein the transversal filter is a finite infinite response (FIR) filter.

11. The programmable driver/equalizer of claim 1 wherein the controllable driver set comprises weighted current drivers.

12. The programmable driver/equalizer of claim 1 wherein the transversal filter controls the activation of the controllable driver set.

13. The programmable driver/equalizer of claim 1 wherein the programmable filter coefficient sets are based on the characteristics of the transmission media, speed of transmission, and characteristics of a receiving unit.

14. The programmable driver/equalizer of claim 1 wherein the coefficients of the filter are altered in small increments and matched to each other.

15. The programmable driver/equalizer of claim 1 wherein the driver output peak amplifier is constant, independent of programmable coefficient selection.

16. A method for overcoming InterSymbol Interference (ISI) and other various transmission impairments in a variety of transmission media, comprising the steps of:
    (a) connecting a controllable driver set to an input node and to a transversal filter including a set of programmable coefficients coupled to a transmission medium;
    (b) biasing the controllable driver set for constant output peak amplitude, regardless of coefficient settings;
    (c) compensating the driver for self-induced driver ISI; and
    (d) altering the coefficients of the transversal filter to vary the driver set output to provide a frequency response which is the inverse of the transmission medium.

17. The method of claim 16 further comprising the steps of:
(e) storing a present data output signal bit and a history of at least two past data signal input bits in the transversal filter as time delay units.

18. The method of claim 16 further comprising the steps of:
(e) enabling power settings of the controllable driver set to be used for all possible coefficient possibilities.

19. The method of claim 16 further comprising the step of:
(e) reducing self-induced intersymbol interference from the drivers by the drive strength of an output stage.

20. The method of claim 16 further comprising the steps of:
(e) switching off paths to high capacitance nodes in the driver circuit when the coefficients are inactive to minimize ISI.

21. The method of claim 16 further comprising the steps of:
(e) selecting a combination of control bits for the coefficient setting means to select the appropriate frequency response for the driver according to the various transmission medium conditions.

22. The method of claim 16 wherein the controllable driver set is plural current mode differential drive circuits.

23. A program medium, executable in a computer system, for overcoming InterSymbol Interference (ISI) and other transmission impairments in a variety of transmission media, the medium comprising:
(a) program instructions in the medium for connecting a controllable driver set to an input node and to a transversal filter including a set of programmable coefficients coupled to a transmission medium;
(b) program instructions in the medium for biasing the controllable driver set for constant output peak amplitude, regardless of coefficient settings;
(c) program instruction in the medium for compensating the drivers for self induced ISI:
(d) program instructions in the medium for altering the coefficients of the transversal filter to vary the driver set output to provide a frequency response which is the inverse of the transmission medium.

24. The program medium of claim 23 further comprising:
(e) program instructions in the medium for storing a present data output signal bit and a history of at least two past digital bits in the transversal filter as time delay units.

25. The program medium of claim 23 further comprising:
(e) program instructions in the medium for enabling power settings of the controllable driver set to be used for all possible coefficient possibilities.

26. The program medium of claim 23 further comprising:
(e) program instructions in the medium for reducing self-induced intersymbol interference from the drivers by the drive strength of an output stage.

27. The program medium of claim 23 further comprising:
(e) program instructions in the medium for switching off paths to high capacitance nodes in the driver circuit when the coefficients are inactive to minimize ISI.

28. The program medium claim 23 further comprising:
(e) program instructions in the medium for selecting a combination of control bits for the coefficient setting means to select the appropriate frequency response for the driver according to the various transmission medium conditions.

29. The programming medium of claim 23 further comprising:
(e) program instructions in the medium for biasing the controllable driver set for constant output peak amplitude, regardless of coefficient settings; and
(f) program instructions in the medium for altering the coefficients of the transversal filter to vary the driver set output to provide a frequency response which is the inverse of the transmission medium.

30. A programmable driver equalizer for overcoming InterSymbol interference (ISI) and other transmission impairments in a variety of transmission media, comprising:
(a) a controllable driver providing true and compliment outputs to a transmission line;
(b) a set of coefficient compensation level circuits coupled to the transmission lines for reducing self-induced driver ISI;
(c) a transversal filter providing true and complement control signals to the driver, the filter including coefficient driver setting circuits, one circuit coupled to the true and the other coupled to the compliment lines and both having programmable filter coefficients; and
(d) means for altering the frequency response from the controllable driver based on a Z transform matching the inverse of the frequency response of the transmission medium.

31. The programmable driver equalizer of claim 30, further comprising:
a power down circuit, which switches the transversal filter off high compacitance nodes when the filter coefficients are inactive.

32. The programmable driver/equalizer of claim 31, further comprising:
a power down signal, which operates the power down circuit to lower the power applied to the transmission line via a current amplifier.

33. The programmable driver/equalizer of claim 31, further comprising:
an output current source connected to the transmission line and switched off when the power down circuit is activated providing a high impedance pass to ground thereby increasing the transmission line bandwidth and reducing InterSymbol interference.

* * * * *